L. J. COCK ET AL

SUPERHETERODYNE RECEIVING ARRANGEMENT
FOR USE AT ULTRASHORT WAVES

Filed Feb. 15, 1950

LUDOLF JENTJE COCK
BERNHARDUS GERHARDUS DAMMERS
WILLEM WIGGER BOELENS
JACOBUS RODRIGUES DE MIRANDA
INVENTORS

BY Fred M. Vogel
AGENT

Patented Dec. 8, 1953

2,662,171

UNITED STATES PATENT OFFICE 2,662,171

SUPERHETERODYNE RECEIVING ARRANGEMENT FOR USE AT ULTRASHORT WAVES

Ludolf Jentje Cock, Bernhardus Gerhardus Dammers, Willem Wigger Boelens, and Jacobus Rodriguez de Miranda, Eindhoven, Netherlands, assignors to Hartford National Bank and Trust Company, Hartford, Conn., as trustee Application February 15, 1950, Serial No. 144,328

Claims priority, application Netherlands February 16, 1949

10 Claims. (Cl. 250—20)

Figure 1:
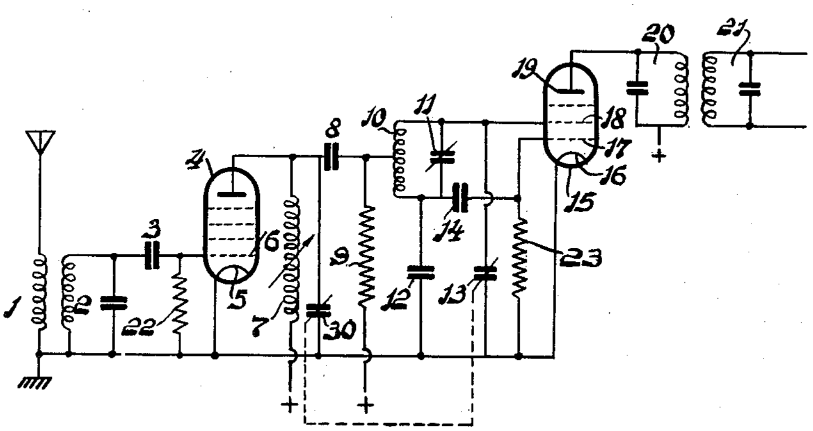

The present invention relates to superheterodyne receiving arrangements and more particularly to mixing circuits, for use at ultra-short waves. The mixing circuit comprises a discharge tube having at least a cathode, an anode, a control grid and an accelerating grid. The signal voltage and the local oscillation voltage are both active at that grid which is nearest the cathode, the intermediate-frequency oscillations being taken from an impedance included in the anode circuit.

Arrangements of this kind are known. Furthermore, it has been suggested to utilise the two grids, together with the cathode, for generating the local oscillations and to supply the signal oscillations to a third grid located outside the said grids. In this case only a low mutual conductance can be obtained. If, however, the signal wave and the locally generated wave are both active at the first control grid of the tube, there will generally be undesired coupling between the high-frequency circuit and the oscillator circuit, with the result that in controlling the high-frequency circuit, the oscillator frequency is also acted upon, which is highly undesirable.

The principal object of the invention is to provide a mixing circuit for ultra-high frequency oscillations in which a satisfactory mutual conductance is ensured.

Another object of the invention is to provide a mixing circuit for ultra-high frequency oscillations in which interaction of the high-frequency circuit and the oscillator circuit is minimised.

Still another object of the invention is to provide a mixing circuit for ultra-high frequency oscillations which exhibits a high signal-to-noise ratio.

Further objects of the invention will appear from the following description.

According to the invention, in an arrangement of the kind above described, the inductance of the local oscillator tuning circuit is interposed between the two grids and the ends of this inductance are connected through capacitors to the cathode. The input signal wave is supplied through a tap of the said inductance to the control grid of the mixing tube. This tap may be so chosen that control of the preceding high-frequency circuit does not affect the tuning frequency of the oscillator circuit.

The said capacities between the inductance of the oscillator circuit and the cathode constitute the circuit capacity of the oscillator circuit.

The frequency of the oscillator is adjustable with the use of either of the said capacities or by variation of an additional capacity connected in parallel with the inductance. If the oscillator frequency is higher than the incoming frequency, the portion of the said circuit between the cathode and the tap of the inductance to which the signal oscillations are supplied constitutes a capacity which, according to the invention, forms part of a high-frequency circuit, the frequency of which is adjustable with the use of an inductance connected in parallel to the said capacity. The oscillator frequency is substantially unaffected by this adjustment of the high frequency circuit.

If the oscillator frequency is lower than the signal frequency, the oscillator circuit between the said tap of the inductance and the cathode constitutes an inductance which, with the use of an adjustable condenser connected in parallel therewith, is tunable to a signal frequency without the oscillator frequency being affected thereby.

Figure 2:
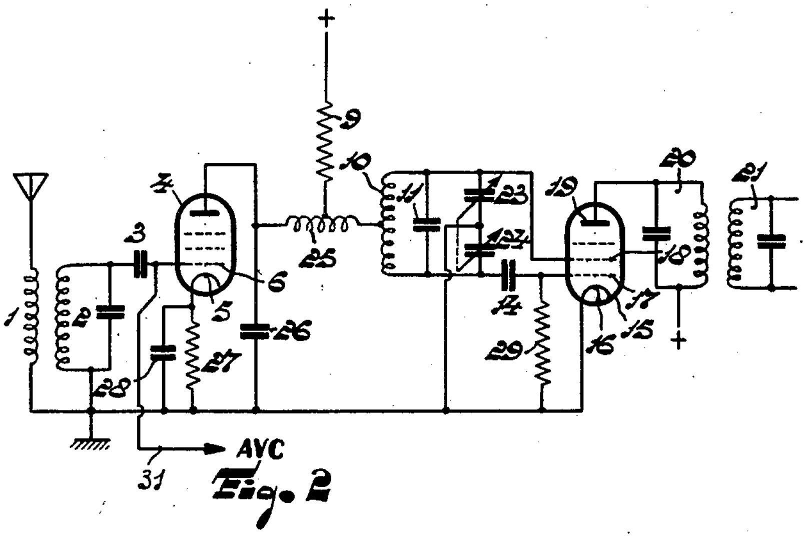

The invention will now be explained more fully by reference to the accompanying drawing in which:

Figure 1 shows a schematic diagram of a mixing circuit in accordance with the invention, and Figure 2 shows a modification of the circuit of Figure 1.

Referring now to the drawing and more particularly to Fig. 1, an inductance 1, included in the antenna circuit, is coupled to the inductance of a first circuit 2, tuned to the incoming frequency. The high-frequency oscillations are supplied from circuit 2 through a condenser 3 to a control grid 6 of a high-frequency amplifying tube 4, which is shown as a pentode. Grid bias for tube 4 is provided by a grid leak resistor 22 connected between grid 6 and ground.

The anode circuit of the tube 4 includes an adjustable inductance 7, of which the extremity remote from the anode is connected to the positive terminal of the source of supply. The anode of the tube 4 is furthermore connected through a condenser 8 to a tap, preferably a center tap, of an inductance 10, which forms part of the tuning circuit of the local oscillator. The upper end of coil 10 for this purpose connected to an accelerating grid 18 of a pentode 15. Grid 18 serves as an oscillator anode. The lower end of coil 10 is connected through a condenser 14 to a control grid 17. The latter is negatively biassed with respect to a grounded cathode 16 by the potential developed across a grid leak resistor 23 connected between grid 17 and ground.

If necessary, an additional biassing potential may be provided by including a resistor in the cathode lead, which resistor should be shunted by a large condenser. The oscillator circuit further comprises condensers 12 and 13, which are interposed between the respective ends of the coil 10 and the cathode. An adjustable condenser 11 may be provided parallel to the coil. The oscillator anode 18 is positively biassed, for example, through a resistance 9 coupled between the tap of coil 10 and the positive source of supply. An anode 19 of tube 15 is connected to the positive terminal of the source of supply through a circuit 20, which is tuned to the intermediate frequency and which is coupled to a circuit 21, likewise tuned to the intermediate frequency. The intermediate-frequency oscillations are taken from circuit 21 to be further amplified and detected.

The elements 10, 11, 12, 13 constitute an oscillatory circuit across which appear the local oscillations generated by the tube 15. The tapping point on the coil 10 is such that the upper part of the coil comprising the condenser 13 and the lower part of the coil comprising the condenser 12 are approximately in series resonance at the local oscillatory frequency. The tapping point is in this case substantially at zero potential with respect to the local oscillator frequency and a control of the variable inductance 7 does not affect the oscillator frequency. The oscillator circuit between the tapping point and the cathode constitutes a capacity which is tunable to the incoming wave with the use of the inductance 7.

The foregoing applies if the oscillator frequency is higher than the incoming frequency, as will generally be the case. If however, the oscillator frequency is lower than the incoming frequency, the oscillator circuit between the tapping point and the cathode constitutes a capacity and the inductance 7 will have to be replaced by an adjustable condenser if it is desired that the output circuit of the pentode 4 be tuned to the signal frequency.

It is alternatively possible, instead of providing the tapping point of the oscillator circuit on the coil 10, to use therefor the common point of two series-connected condensers, which are connected parallel to the coil 10. In this case it will be required to supply the voltage for the oscillator anode in a different manner, for example by way of an inductance. The inductance may, as an alternative, be included between the anode of the high-frequency amplifying tube and the tapping on the oscillator circuit.

The capacities 11, 12, 13 may be constituted each individually or in part by the capacities already present by nature. Preferably, however, the capacity 12 is constituted by the natural capacity between the grid 17 and the cathode 16 and the capacities 11 and 13 are provided by adjustable condensers. The minimum voltage at the tapping point on the coil 10 is in this case adjusted with the use of condenser 13, the condenser 11 serving for tuning to the correct frequency.

The arrangement may alternatively be designed for a wave-band by varying the capacities 12 and 13 by equal values or by adjusting the condenser 11. In this case the element 2 must also be varied. By providing parallel to the inductance 7 a condenser 30 which varies in a similar manner as the condenser of the input circuit and as the condenser 11, a circuit-arrangement ensures in which a constant frequency difference between the input circuit and the oscillator circuit is maintained. This arrangement is important for the reception of frequency-modulated oscillations, if the use is made of a number of transmitters located in a single continuous waveband.

Parallel to the inductance of the oscillator tuning circuit there are preferably connected in series the capacities of a double-ganged condenser, the stator of which is divided into two mutually insulated assemblies of plates. These capacities, upon operation of the condenser, vary in the same sense, the common point of the capacities being connected to ground with respect to high-frequency oscillations.

The two capacities of the condenser are parallel for the input circuit of the mixing tube, which is tuned to the high-frequency signal voltage, so that variation in these capacities also involves variation in the natural frequency of the input circuit. It has been found that this variation may approximately be equal to the variation in the tuning of the oscillator circuit so that a substantially constant frequency difference may be maintained.

The condenser may comprise two identical stators, relatively insulated, and a single rotor which is connected to ground. The high-frequency circuit preceding the mixing stage is preferably constituted in part by an inductance, one end of which is connected to the tapping of the inductance of the oscillator circuit and the other end of which is connected through a condenser to ground.

Fig. 2 shows, by way of example, one embodiment of such an arrangement.

The high-frequency signal oscillations originating from an antenna 1 are inductively transmitted, as in the circuit of Fig. 1, to an input circuit 2, tuned to the incoming frequency. One end of circuit 2 is connected through a condenser 3 to a control grid 6 of a high-frequency amplifying tube 4, shown as a pentode, and the other end is connected to ground. The parallel combination of a resistance 27 and a condenser 28 is provided between the cathode 5 and ground to provide suitable grid bias. A voltage for automatic volume control may be supplied to the grid 6 through conductor 31.

Contrary to the arrangement shown in Fig. 1, the anode of the tube 4 is connected to ground through a condenser 26, which may be of the order of magnitude of 80 $\mu\mu f$. This condenser forms part of the output circuit of tube 4 which is tuned to the signal frequency and which furthermore comprises an inductance 25, through a tapping of which the anode voltage for the tube 4 is supplied, and this preferably through a supply resistance 9. One end of the inductance 25 is connected to the anode of tube 4 and the other to a tap on an inductance 10, which constitutes the inductive part of the local oscillator tuning circuit. The local oscillator comprises a pentode 15, a cathode 16 of which is connected to ground and control grid 17 and accelerating grid 18 of which are connected to the ends of the inductance 10. A positive potential is applied to the grid 18 through the resistance 9, the right-hand part of the inductance 25 and the upper part of the inductance 10. The condenser 14 is of the blocking type, which prevents the grid 17 from being positively biassed.

Anode 19 of tube 15 is connected to the source of supply by way of a circuit 20 tuned to the intermediate frequency. The circuit 20 is coupled to a circuit 21, likewise tuned to the intermediate frequency. The intermediate-frequency oscillations are derived from further amplification and detection from circuit 21. A fixed capacity 11 may be connected parallel to the coil 10.

In order to enable the oscillator circuit to be tuned through a desired frequency range, the series combination of two variable capacities 23 and 24 is provided parallel to the coil 10, the common point of the said capacities being connected to ground. The capacities are provided by a condenser having two substantially identical stators and a single rotor which is connected to ground. The capacities upon tuning vary in the same sense. The parallel combination of the two halves of the inductance 10, each of which is connected in series with one variable capacity, constitutes for the signal wave, if the oscillator frequency is higher than the signal frequency, a variable capacity which forms part of the high-frequency output circuit of the tube 4. Consequently, the said output is likewise tuned upon variation of the capacities 23 and 24, since the latter may be regarded as connected in parallel with respect to the said circuit.

It has been found that in this case the difference frequency between the oscillator circuit and the output circuit of the tube 4 may be maintained substantially constant over a comparatively broad range. It has been found in practice that satisfactory reception of the band of transmitters with frequency modulation which extends from 88 to 108 mc./sec. may thus be ensured. The arrangement also lends itself to the reception of television signals. The tuning of circuit 2 will preferably be coupled to the said tuning of the oscillator circuit so that the three available circuits may be tuned simultaneously by a single tuning knob. The construction is simpler than with the use of an ordinary three-ganged condenser.

It may be mentioned that it is known as such to realise a high-frequency coupling circuit between two stages in the form of a series-inductance, the ends of which are connected by way of condensers to a point of constant potential. In the case under consideration, one capacity is constituted by the oscillator circuit. The particular advantage obtained is that upon tuning of the oscillation circuit, with suitable proportioning of the various circuit elements, the capacity constituted by this circuit, when considered as part of the preceding tube, ensures correct tuning of the said output circuit to the incoming frequency through a comparatively broad range of frequencies.

While I have described my invention in a specific use thereof and in specific embodiments, I do not wish to be limited thereto, for obvious modifications will occur to those skilled in the art without departing from the spirit and scope of the invention.

What we claim is:

1. A circuit arrangement for mixing a first wave and a second wave to produce an intermediate frequency wave, comprising an electron discharge tube having a cathode, a control grid, an accelerating grid and an anode, a first impedance network tuned to the frequency of said second wave and comprising a tapped inductive element coupled between said grids, a first capacitive element coupled between one end of said inductive element and said cathode and a second capacitive element coupled between the other end of said inductive element and said cathode, means to apply a positive potential relative to cathode to said accelerating grid thereby to sustain local oscillations at the frequency of said second wave in said first network, means including an impedance element to apply said first wave to the tap of said inductive element, said impedance element and said first network constituting a circuit tuned to said first wave, said tap having a position at which a change in the impedance element does not affect the tuning of said first network with respect to said second wave, a second impedance network coupled to said anode, and means to derive said intermediate frequency wave from said second impedance network.

2. A circuit arrangement for mixing a first wave and a second wave to produce an intermediate frequency wave, comprising an electron discharge tube having a cathode, a control grid, an accelerating grid and an anode, a first impedance network tuned to the frequency of said second wave and comprising a tapped inductive element coupled between said grids, a first capacitive element coupled between one end of said inductive element and said cathode, a second capacitive element coupled between the other end of said inductive element and said cathode and a third capacitive element coupled in parallel with said inductive element, means to apply a positive potential relative to cathode to said accelerating grid thereby to sustain local oscillations at the frequency of said second wave in said first network, means including an impedance element to apply said first wave to the tap of said inductive element, said impedance element and said first network constituting a circuit tuned to said first wave, said tap having a position at which a change in the impedance element does not affect the tuning of said first network with respect to said second wave, a second impedance network coupled to said anode, and means to derive said intermediate frequency wave from said second impedance network, said tap having a position substantially at zero potential with respect to said second wave.

3. A circuit arrangement for mixing a first wave and a second wave to produce an intermediate frequency wave, comprising an electron discharge tube having a cathode, a control grid, an accelerating grid and an anode, a first impedance network tuned to the frequency of said second wave and comprising a tapped inductive element having one end thereof coupled to said control grid and having the other end thereof coupled to said accelerating grid, a capacitive element coupled between said one end of said inductive element and said cathode, a first variable capacitive element coupled between said other end of said inductive element and said cathode and a second variable capacitive element coupled between said ends of said inductive element, means to apply a positive potential relative to cathode to said accelerating grid thereby to sustain local oscillations at the frequency of said second wave in said first network, means including an impedance element to apply said first wave to tap of said inductive element, said impedance element and said first network constituting a circuit tuned to said first wave, said tap having a position at which a change in the impedance element does not affect the tuning of said first network with respect to said second wave, a second impedance network coupled to said anode, and means to derive said intermediate frequency wave from said second impedance network.

4. A circuit arrangement for mixing a first wave and a second wave having a frequency greater than the frequency of said first wave to produce an intermediate frequency wave, comprising an electron discharge tube having a cathode, a control grid, an accelerating grid and an anode, a first impedance network tuned to the frequency of said second wave and comprising a tapped inductive element coupled between said grids, a first capacitive element coupled between one end of said tapped inductive element, and said cathode and a second capacitive element coupled between the other end of said tapped inductive element and said cathode, means to apply a positive potential relative to cathode to said accelerating grid thereby to sustain local oscillations at the frequency of said second wave in said first network, means to apply said first wave to the tap of said tapped inductive element, an inductive element coupled between the tap of said tapped inductive element and a point of constant potential, means to vary the inductance of said inductive element to tune said inductive element and said first impedance network to the frequency of said first wave, said tap having a position at which a change in said inductive element does not affect the tuning of said first network relative to said second wave, a second impedance network coupled to said anode, and means to derive said intermediate frequency wave from said second impedance network.

5. A circuit arrangement for mixing a first wave and a second wave to produce an intermediate frequency wave, comprising an electron discharge tube having a cathode, a control grid, an accelerating grid and an anode, a first impedance network tuned to the frequency of said second wave and comprising a tapped inductive element coupled between said grids, a first capacitive element coupled between one end of said tapped inductive element and said cathode, a second capacitive element coupled between the other end of said tapped inductive element and said cathode and a third capacitive element coupled in parallel with said tapped inductive element, means to apply a positive potential relative to cathode to said accelerating grid thereby to sustain local oscillations at the frequency of said second wave in said first network, means to apply said first wave to the tap of said tapped inductive element, an inductive element coupled between the tap of said tapped inductive element and a point of constant potential, means to vary the inductance of said inductive element to tune said inductive element and said first impedance network to the frequency of said first wave, said tap having a position at which a change in said inductive element does not affect the tuning of said first network relative to said second wave, a fourth capacitive element coupled in parallel with said inductive element, means to simultaneously vary the capacitance of said fourth capacitive element and the capacitance of one of said first, second and third capacitive elements to maintain said intermediate frequency constant, a second impedance network coupled to said anode, and means to derive said intermediate frequency wave from said second impedance network.

6. A circuit arrangement for mixing a first wave and a second wave to produce an intermediate frequency wave, comprising an electron discharge tube having a cathode, a control grid, an accelerating grid and an anode, a first impedance network tuned to the frequency of said second wave and comprising a first inductive element coupled between said grids, a first capacitive element coupled between one end of said first inductive element and said cathode and a second capacitive element coupled between the other end of said first inductive element and said cathode, means to apply a positive potential relative to cathode to said accelerating grid thereby to sustain local oscillations at the frequency of said second wave in said first network, said first impedance network having a point constituting a substantially electrically centered tapping at the frequency of said second wave, a second inductive element having one end thereof coupled to said tapping, means to apply said first wave to the other end of said second inductive element, a second impedance network coupled to said anode, and means to derive said intermediate frequency wave from said second impedance network.

7. A circuit arrangement for mixing a first wave and a second wave to produce an intermediate frequency wave, comprising an electron discharge tube having a cathode, a control grid, an accelerating grid and an anode, a first impedance network comprising a tapped inductive element coupled between said grids and a pair of condensers connected in series between the ends of said inductive element and having their junction connected to ground potential at the frequencies of said first and second waves, means to apply a positive potential relative to cathode to said accelerating grid thereby to sustain local oscillations at the frequency of said second wave in said first network, means to simultaneously vary the capacities of said condensers to tune said first impedance network to the frequency of said second wave, means to apply said first wave to the tap of said inductive element, a second impedance network coupled to said anode, and means to derive said intermediate frequency wave from said second impedance network.

8. A circuit arrangement for mixing a first wave and a second wave to produce an intermediate frequency wave, comprising an electron discharge tube having a cathode, a control grid, an accelerating grid and an anode, a first impedance network tuned to the frequency of said second wave and comprising a tapped inductive element coupled between said grids and a capacitive element coupled in parallel with said tapped inductive element, said capacitive element comprising a pair of variable capacitors having substantially identical stators insulated with respect to each other and a common rotor coupled to ground potential at the frequencies of said first and second waves, means to apply a positive potential relative to cathode to said accelerating grid thereby to sustain local oscillations at the frequency of said second wave in said first network, means to apply said first wave to the tap of said tapped inductive element, a second impedance network coupled to said anode, and means to derive said intermediate frequency wave from said second impedance network.

9. A circuit arrangement for mixing a first wave and a second wave to produce an intermediate frequency wave, comprising an electron discharge tube having a cathode, a control grid, an accelerating grid and an anode, a first impedance network tuned to the frequency of said second wave and comprising a tapped inductive element coupled between said grids and a capacitive element coupled in parallel with said tapped inductive element, said capacitive element comprising a pair of variable capacitors having substantially identical stators insulated with respect to each other and a common rotor coupled to ground potential at the frequencies of said first and second waves, means to apply a positive potential relative to cathode to said accelerating grid thereby to sustain local oscillations at the frequency of said second wave in said first network, an inductive element having one end thereof coupled to the tap of said tapped inductive element, means to apply said first wave to the other end of said inductive element, a second impedance network coupled to said anode, and means to derive said intermediate frequency wave from said second impedance network.

10. A circuit arrangement as set forth in claim 1 wherein said first and second capacitive elements are constituted by variable capacitors, and means for concurrently adjusting the values of said variable capacitors in the same sense.

LUDOLF JENTJE COCK.
BERNHARDUS GERHARDUS DAMMERS.
WILLEM WIGGER BOELENS.
JACOBUS RODRIGUEZ DE MIRANDA.

References Cited in the file of this patent

UNITED STATES PATENTS

| Number | Name | Date |
|---|---|---|
| 1,818,157 | Philips | Aug. 11, 1931 |
| 1,863,564 | Chretien | June 21, 1932 |
| 1,895,091 | Wheeler | Jan. 24, 1933 |
| 1,957,446 | Dow | May 8, 1934 |
| 1,927,189 | Gottschalk | Sept. 4, 1934 |
| 2,010,253 | Barton | Aug. 6, 1935 |
| 2,051,177 | Rath | Aug. 18, 1936 |
| 2,058,430 | Elliott | Oct. 27, 1936 |
| 2,156,809 | Fredrickson | May 2, 1939 |